United States Patent [19]

Hashimoto et al.

[11] 4,267,577
[45] May 12, 1981

[54] LOW POWER CONSUMPTION INTEGRATED CIRCUIT FOR A COMBINED TIMEPIECE AND CALCULATOR

[75] Inventors: Shintaro Hashimoto, Nara; Toshio Nishimura, Jyoyo, both of Japan

[73] Assignee: Sharp Kabushiki Kaisha, Osaka, Japan

[21] Appl. No.: 33,711

[22] Filed: Apr. 26, 1979

[30] Foreign Application Priority Data

Apr. 28, 1978 [JP] Japan .................................. 53-53139

[51] Int. Cl.³ ...................... G06F 15/02; G04B 47/00
[52] U.S. Cl. .................................... 364/707; 364/705
[58] Field of Search .............................. 364/705, 707

[56] References Cited

U.S. PATENT DOCUMENTS

| | | | |
|---|---|---|---|
| 3,941,989 | 3/1976 | McLaughlin et al. | 364/707 |
| 3,955,355 | 5/1976 | Luce | 364/705 X |
| 4,093,992 | 6/1978 | Kawamura et al. | 364/705 |

Primary Examiner—Jerry Smith
Attorney, Agent, or Firm—Birch, Stewart, Kolasch & Birch

[57] ABSTRACT

An integrated circuit device having a combined timekeeping mode and calculator mode comprises a generator stage for generating basic clock signals and system clock signals, a processor stage responsive to a supply of the system clock signals for executing arithmetic operations required for the timekeeping mode and the calculator mode key input members for introducing information into the processor stage as key input signals, and a clock control for controlling the supply of the system clock signals. The processor stage is adapted to develop a command signal to indicate the completion of the arithmetic operations. The clock control is responsive to the rising and trailing edges of the key input signals for enabling the supply of the system clock signals. The generation of the command signal causes the clock control to prevent the system clock signals from being fed to the processor stage.

9 Claims, 3 Drawing Figures

LOW POWER CONSUMPTION INTEGRATED CIRCUIT FOR A COMBINED TIMEPIECE AND CALCULATOR

BACKGROUND OF THE INVENTION

The present invention relates to an integrated circuit and, more particularly, to a low power consumption integrated circuit for electronic equipment such as a combined timepiece and calculator.

Nowadays, CMOS-LSI semiconductor chips have been employed in a wide range of battery-powdered electronic apparatus because there is a requirement for a reduction in power consumption. For example, an electronic digital timekeeper has empolyed a CMOS-LSI semiconductor chip of the ROM-RAM scheme. In case where such timekeeper is additionally provided with the conventional calculator functions, power dissipation incurred within a power battery would be remarkably increased. Reduction in power consumption is still most desirable.

OBJECT AND SUMMARY OF THE INVENTION

Accordingly, it is the primary object of the invention to provide an improved low power consumption integrated circuit for electronic equipment, such as a combined timepiece and calculator.

It is a further object of the invention to provide an improved low power consumption integrated circuit for a battery-powered electronic equipment where the transference of system clock signals is controlled in a relationship with the level of externally applied input signals such as key input signals.

It is a further object of the invention to provide an improved control system for a low power consumption integrated circuit for a battery-powered electronic equipment such as a combined timepiece and calculator where the system transmission of system clock signals is controlled in a relationship with the rising and trailing levels of externally applied input signals such as key input signals.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, an integrated circuit device having at least a timekeeping function comprises a generator stage for generating basic clock signals and system clock signals, the latter being obtainable by modifying the basic clock signals, a processor stage responsive to a supply of the system clock signals for executing operations required for the timekeeping function and for generating a command signal to indicate the completion of the operations, key input means for introducing information into the processor stage as key input signals, and a clock control for enabling supply of the system clock signals to the processor stage according to the rising and trailing edges of the key input signals are for preventing supply of the system clock signals to the processor stage according to the command signal.

The integrated circuit device may have an additional calculator function in a specific form of the present invention.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DETAILED DESCRIPTION OF THE INVENTION

Figure 1:
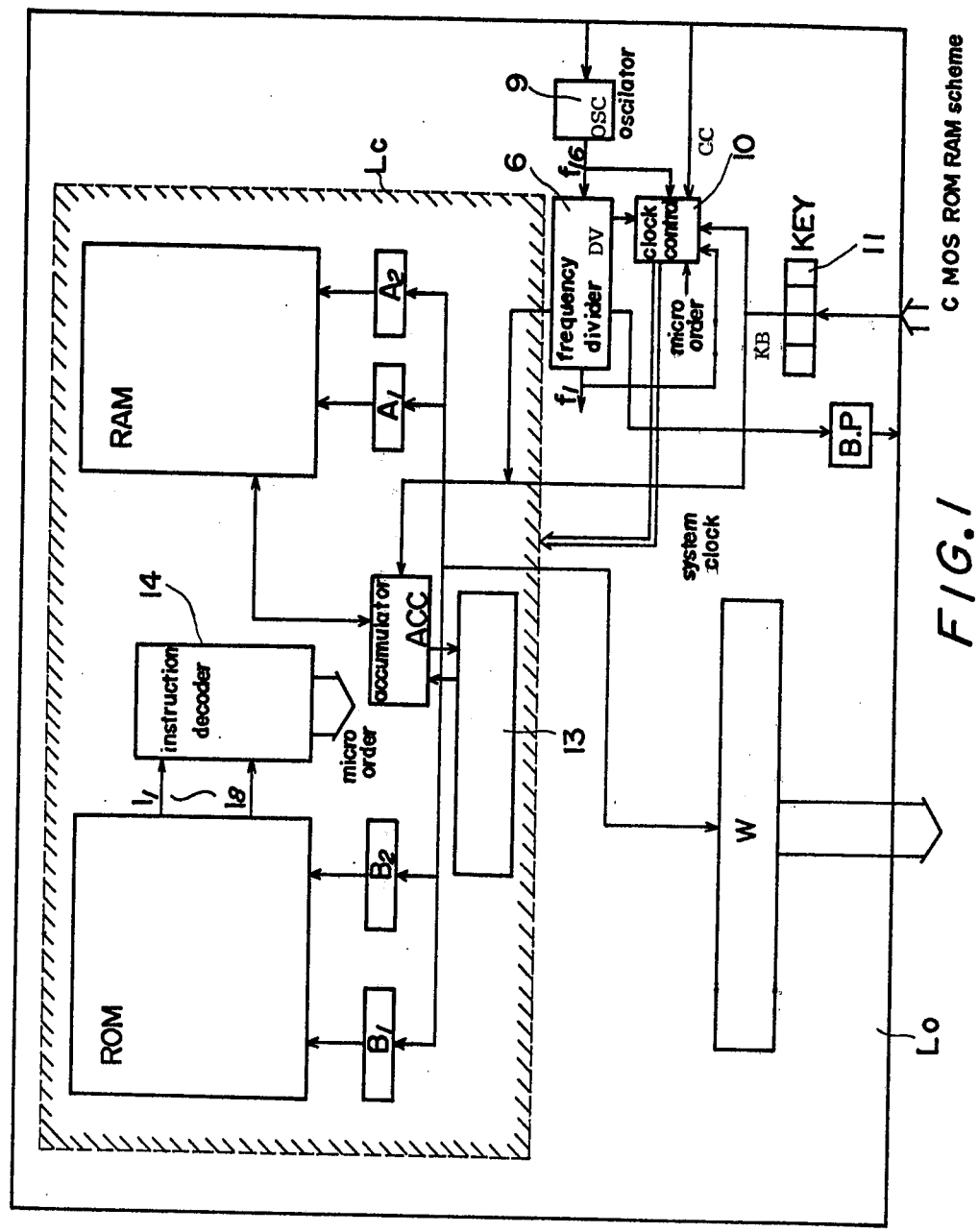
FIG. 1 is a block diagram of the implementation of a large-scale integrated circuit (LSI) semiconductor chip according to the present invention.

FIG. 1 illustrates a schematic diagram of one preferred form of the present invention which is provided with a timekeeper function and a calculator function as combined electronic equipment.

An LSI semiconductor chip for a combined timepiece and calculator of the present invention is related to our copending patent application Ser. No. 854,214 filed Nov. 23, 1977, now U.S. Pat. No. 4,218,876, the disclosure of which is incorporated herein by reference.

The integrated circuit described in Ser. No. 854,214 was featured by controlling the transference of system clock signals into operation elements for causing timekeeping and calculation operations according to the presence and absence of externally applied input signals such as key input signals.

Such a system as disclosed in U.S. Pat. No. 4,218,876, however, had still a disadvantageous point in that the system clock signals were inclined to generate operations other than arithmetic operations if the key input means was actuated during the arithmetic operation times. This meant that no low power dissipation was taking place by restricting the oversupply of the system clock signals because the system clock signals continued to be generated. Such actuation of the key input means can be carried out on an ordinary occasion.

With reference to FIG. 1, a MOS-LSI semiconductor chip labeled "$L_o$" having the timekeeper function and calculator function, includes a central processor unit $L_c$, a key input buffer 11, a display output register W and a display signal generator BP, these components being well known in the art of an electronic calculator. Furthermore, the LSI semiconductor chip $L_o$ includes a read only memory ROM storing a variety of program routines, a random access memory RAM for storage of a plurality of pieces of information, a digit selection register $B_1$ for the ROM, a page selection register $B_2$ for the ROM, an accumulator register ACC, a digit selection register $A_1$ for the RAM, a register selection register $A_2$ for the RAM, an instruction decoder for decoding outputs $I_1$–$I_8$ from the ROM into microinstructions, an adder 13, etc.

A display buffer register W stores selected ones of the pieces of information contained within the RAM. A generator BP provides enabling signals for a digital liquid crystal display. The key buffer register 11 stores temporarily the key input signals.

The LSI semiconductor chip $L_o$ further comprises a quartz oscillator 9, a frequency divider 6 for providing timekeeping signals as well known in the art of an electronic timekeeper and a clock control 10 as described later.

With such an arrangement, basic clock signals $f_{16}$ from the oscillator 9 are fed to the frequency divider 6 which in turn changes them into second signals $f_1$. The clock control 10 receives the basic clock signal $f_{16}$ and a frequency signal $f_{15}$ formed within the frequency divider 6 and produces system clock signals $\phi_1$–$\phi_3$. The system clock signals $\phi_1$–$\phi_3$ supplied to the LSI chip $L_c$ and the like. The LSI chip consumes power while being supplied with the system clock signals clock signals $\phi_1$–$\phi_3$.

Upon supply of the system clock signals $\phi_1$–$\phi_3$ the LSI chip may operate in either of the two operating modes, that is, the timekeeper mode and the calculator mode. The contents of the ROM are converted into the microinstructions Ⓐ, Ⓑ, ... through the instruction decoder 14. The microinstructions are effective to control ACC, $A_1$, $A_2$, 13, etc. The arithmetic operation required for the calculator mode rely upon these microinstructions.

Though the timekeeper operations are carried out in substantially the same manner, in this case all that is necessary is to add the second signal $f_1$ to the region of the RAM holding timekeeping information, change desired pieces of timekeeping information such as data, hour, and minute and modify the display register W.

Arithmetic operations used in the timekeeper mode in the sense of the present invention means the following items of procedures: after a second has passed away, (I) the procedure by which adds "1" to a second counter provided within the RAM; (II) the procedure by which sexagesimal compensation is effected upon memories storing the timekeeper information such as month, data, hour, minute, etc.; (III) the procedure by which the timekeeper information such as month, date, hour, minute, etc., is transmitted into the output register W; and (IV) the procedure by which comparison with wake up time, etc., provides an alarm sound. The arithmetic operations used in the calculator mode means arithmetic operations responsive to depression of respective keys, for example, four-rule calculations.

The system clock signals $\phi_1$–$\phi_3$ are provided only during the above-described arithmetic operations. In the timekeeper mode it takes only about 3 msec. to complete the arithmetic operations which should be carried out each time a second has passed away. On the other hand, the arithmetic operations in the calculator mode needs periods of time from 200 to 500 msec. When viewing only the timekeeping mode, power consumption is incurred for only 3 msec. of a second. In contrast, power consumption in the calculator mode is incurred for at most 500 msec.

Pursuant to the teachings of the present invention, the development of the system clock signals $\phi_1$–$\phi_3$ is suppressed except when the above-described arithmetic operations are being processed, thereby enabling a reduction in power consumption incurred within the LSI semiconductor chip. Of course, the timekeeper information should be held in the display buffer register W and the RAM even when the system clock signals are suppressed.

The suppression of the system clock signals means that the level of the system clock signals $\phi_1$–$\phi_3$ is always restricted at a low level.

Figure 2:
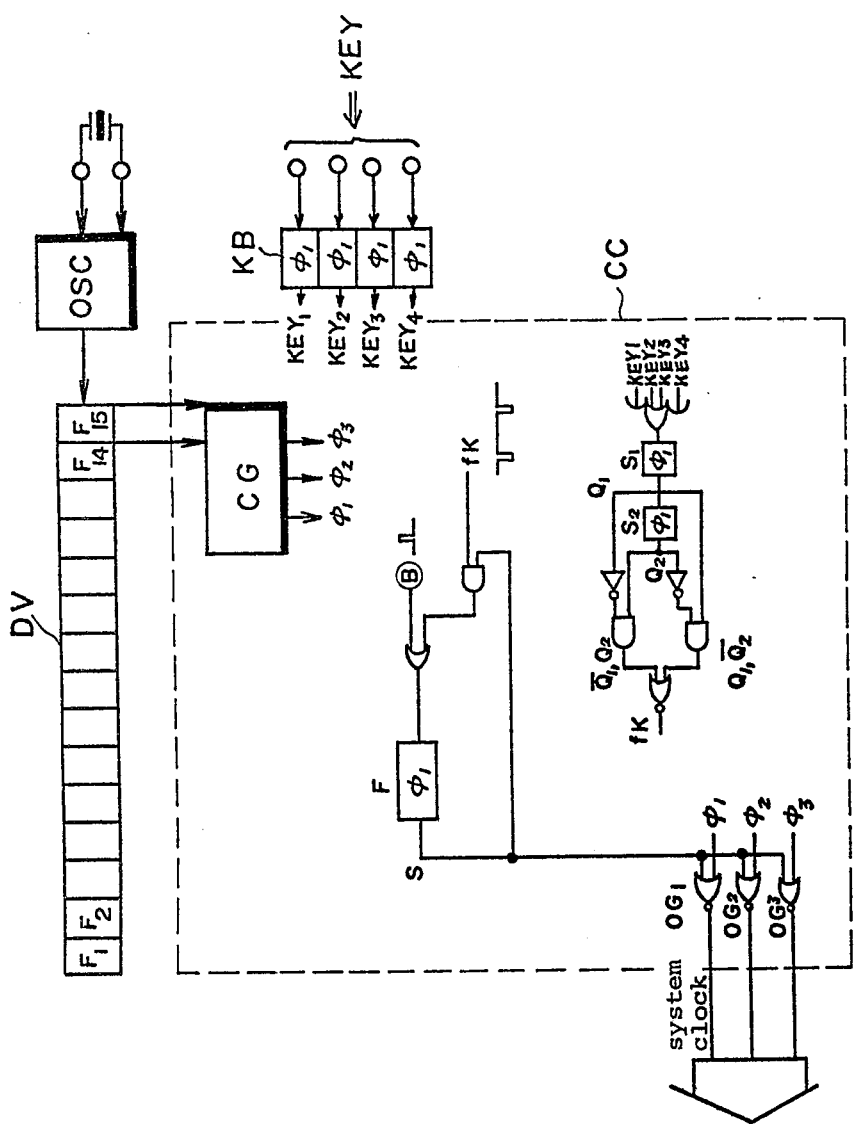
FIG. 2 is a more detailed diagram of the implementation of the LSI semiconductor chip shown in FIG. 1.

FIG. 2 shows more specifically the construction of the clock control 10 as identified as CC. Like elements similar to those of FIG. 1 are indicated by like numerals.

The quartz oscillator 9 denoted as OSC develops the output of, for example, 32.768 KHz as shown by $f_{16}$ in FIG. 1. A 15-bit binary counter $F_1$–$F_{15}$ is adpated to count the oscillation output $f_{16}$ of 32.768 KHz. The formation of the system clock signals $\phi_1$–$\phi_3$ is relied upon the signals $f_{15}$ and $f_{16}$ from the counter. The time sequence of the system clock signals $\phi_1$–$\phi_3$ is determined under the following logic equations which are implemented with a clock generator CG:

$$\phi_1 = \overline{\overline{f_{16}} \cdot f_{15}} = f_{16} + \overline{f_{15}}$$

$$\phi_2 = \overline{\overline{f_{16}} \cdot \overline{f_{15}}} = f_{16} = f_{15}$$

$$\phi_3 = \overline{f_{15}}$$

One of the major features of the present LSI semiconductor chip is that the system clock signals $\phi_1$–$\phi_3$ are formed through the use of a simple gate by utilizing the signals occurring within the frequency divider. The system clock signals $\phi_1$–$\phi_3$ are applied to NOR gates $OG_1$–$OG_3$. Transmission of the signals $\phi_1$–$\phi_3$ into the present system is enabled under the control of a control signal S described below.

When and if the control signals S is at a high level, namely, S=1, the output signals $\phi_1$–$\phi_3$ from the NOR gates $OG_1$–$OG_3$ are all at a low level, namely, 0.

When and if S=1, the system clock signals $\phi_1$–$\phi_3$ are transmitted without any changes therein.

The output of the key input buffer 11 identified as KB in FIG. 2 are indicated by $KEY_1$–$KEY_4$. A signal $f_k$ is provided in synchronization with the rising and trailing edges of the key input signals developed. The signal $f_k$ is obtainable with the logic circuit shown in FIG. 2 according to the logic equation as follows:

$$\overline{Q_1 \cdot Q_2} + Q_1 \cdot \overline{Q_2}$$

The signal $f_k$ has normally a high level with the exception that it is at low level in a relationship with the rising and trailing edges of the key input signals.

A flip-flop F is provided to be set responsive to the signal $f_k$. The flip-flop F is adapted to be reset responsive to a command signal, namely, the microinstruction Ⓑ which is generated to prevent supply of the system clock signals.

The microinstruction Ⓑ is delivered from the ROM upon the termination of the arithmetic operations. The above-mentioned control signal S is the output from this flip-flop F.

The microinstruction Ⓑ which is generated at a timing in a relationship with the occurrence of the system clock signal $\phi$ causes the flip-flop F to be reset when the output of a high level is developed. The generation of the signal $f_k$ of a low level causes the flip-flop F to be set when the output of a low level is developed.

Figure 3:
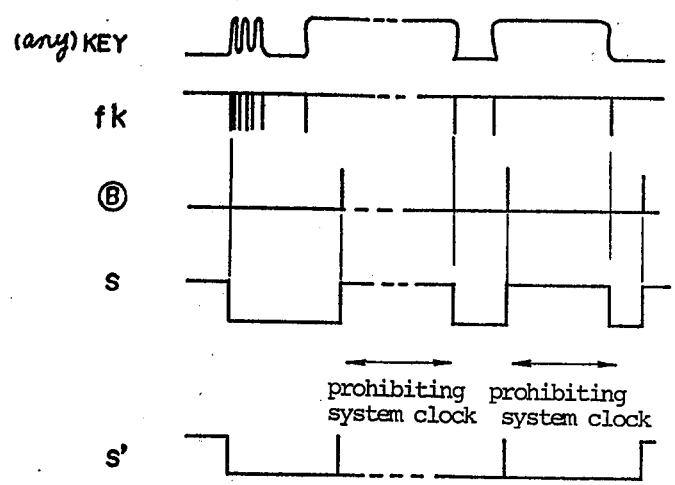
FIG. 3 is a timing chart of signals occurring within the LSI semiconductor chip shown in FIG. 2.

FIG. 3 shows a timing chart of the signals developed within the clock control CC shown in FIG. 2. As is indicated in FIG. 2, the present system clock signals are generated in a relationship with the rising and trailing edges of the key input signals and disappear as soon as the microinstruction on Ⓑ is delivered from the ROM upon the completion of the necessary arithmetic operations.

In other words, the control signal S is adapted to enable the transmission of the system clock signals into the present arithmetic operation system according to the rising and trailing edges of the key input signals. The generation of the microinstruction Ⓑ causes the control signals to prevent the transmission of the system control signals.

Even is the key input signals are still present according to the depression of the key input means, the transmission of the system clock signals is prevented with the aid of the microinstruction Ⓑ. Thereafter, the transmission of the system clock signals is not enabled again unless the trailing edge of the key input signals is developed. This means that power dissipation which is not required is considerably reduced.

A signal S' shown in FIG. 3 indicates the control signal S in a specific sense when the signal $f_k$ is not adapted to control the transmission of the system clock signals.

The invention being thus described, it will be obvious that the same may be varied in many ways. Such variations are not to be regarded as a departure from the spirit and scope of the invention, all such modifications are intended to be included within the scope of the following claims.

What is claimed is:

1. An integrated circuit device having at least a timekeeping function comprising:
    generator stage means for generating basic clock signals and system clock signals, the system clock signals being obtainable by modifying the basic clock signals;
    processor stage means responsive to a supply of the system clock signals for executing operation required for the timekeeping function and for generating a command signal to indicate the completion of the operations associated with the timekeeping function;
    key input means for introducing information into the processor stage and generating key input signals indicative of said information; and
    clock control means for permitting said supply of the system clock signals to energize the processor stage in response to the rising and trailing edges of said key input signals and for preventing the supply of the system clock signals from energizing the processor stage means in response to the command signal from the processor stage means.

2. The integrated circuit device according to claim 1, wherein said processor stage comprises a ROM (read only memory) RAM (random access memory) scheme.

3. The integrated circuit device according to claim 1, wherein the frequency of said basic clock signal is approximately 32 KHz when said generator stage utilizes quartz oscillation.

4. The integrated circuit device according to claim 1, wherein said system clock signals comprise three distinctly phased clock signals.

5. The integrated circuit device according to claim 1, wherein said clock control means further comprises
    determining means responsive to said key input signals for determining the rising and trailing edges of said key input signals,
    flip-flop means responsive to an output of the determining means and to said command signal for generating a control signal, and
    gate means responsive to said system clock signals and the control signals for controlling the transmission of said system clock signals into the processor stage means.

6. The integrated circuit device according to claim 5, wherein said determining means comprises a logic circuit including a logic gate.

7. An integrated circuit device having a combined timekeeping mode and a further mode comprising:
    generator stage means for generating basic clock signals and system clock signals, the system clock signals being obtainable by modifying the basic clock signals;
    processor stage means responsive to a supply of the system clock signals for extending operations required for the timekeeping mode and the further mode and for a generating a command signal to indicate the completion of the operations associated with the timekeeping mode or the further mode;
    key input means for introducing information into the processor stage and developing key input signals indicative of said information; and
    clock control means for permitting said supply of the system clock signals to energize the processor stage means in response to the rising and trailing edges of the key input signals and for preventing said supply of the system clock signals from energizing the processor stage in response to the command signal from the processor stage means;
    whereby the power consumption of said integrated circuit is minimized when said processor stage means is not executing operations during the timekeeping mode and during the further mode.

8. The integrated circuit device according to claim 7, wherein said further mode comprises a calculating mode.

9. The integrated circuit device according to claims 1 or 7, wherein said operations executed by said processor stage means comprise arithmetic operations.

* * * * *